United States Patent [19]

Abe

[11] Patent Number: 5,653,543

[45] Date of Patent: Aug. 5, 1997

[54] FOLDING KEYBOARD

[75] Inventor: Nobuyuki Abe, Nitta-gun, Japan

[73] Assignee: Hosiden Corporation, Osaka, Japan

[21] Appl. No.: 680,152

[22] Filed: Jul. 15, 1996

[30] Foreign Application Priority Data

| Jul. 19, 1995 | [JP] | Japan | 7-182810 |
| Jul. 19, 1995 | [JP] | Japan | 7-182811 |

[51] Int. Cl.⁶ .................................................. B41J 5/10
[52] U.S. Cl. ........................................ 400/489; 361/680
[58] Field of Search .......................... 400/489; 345/168, 345/169; 341/22; 361/680

[56] References Cited

U.S. PATENT DOCUMENTS

| 5,267,127 | 11/1993 | Pollitt | 361/680 |
| 5,543,787 | 8/1996 | Karidis et al. | 341/20 |
| 5,543,790 | 8/1996 | Goldstein | 341/22 |

*Primary Examiner*—Edgar S. Burr
*Assistant Examiner*—Dave A. Ghatt
*Attorney, Agent, or Firm*—Pollock, Vande Sande & Priddy

[57] ABSTRACT

A folding keyboard has an enclosure made up of a rectangular bottom panel with more frontage than depth and a frame having front, rear and left and right banks raised from the four marginal edges of the bottom panel, and a keyboard structure housed in the enclosure. The rear and front banks are split at the center of the enclosure lengthwise thereof and a pair of opposed coupler seats are formed in the split marginal portions of the split rear and front banks. The keyboard structure and the bottom panel are split along a line of demarcation line between key top groups closest to the center line lengthwise of the keyboard structure and the bottom panel, and the split enclosure halves are pivotally secured to each other by couplers which has their left and right end portions received in left and right coupler seats cut in the split left and right rear banks and the split left and right front banks and through which left and right connecting pins are inserted. A folding center line is set above the key tops along the above-said center line, and the left and right connecting pins are positioned at the same distance from the folding center line on straight lines extending therefrom obliquely downward at an angle of 45 degrees thereto.

11 Claims, 11 Drawing Sheets

2

FOLDING KEYBOARD

BACKGROUND OF THE INVENTION

The present invention relates to a folding keyboard for personal computers, word processors and the like.

A variety of folding keyboards have been proposed as in Japanese Pat. Applications Laid-Open Nos. 17723/91 and 148315/90. Any conventional folding keyboard is composed of two rectangular keyboard halves with more frontage than depth and hingedly coupled as a unitary structure which folds in two at the center in its lengthwise direction.

FIG. 1 schematically shows the construction of the folding keyboard disclosed in Japanese Pat. Laid-Open No. 17723/91. This folding keyboard is divided into two at the center thereof and a keyboard enclosure 1 has on either side bearings 2A and 2B connected by a connecting shaft 3 so that the keyboard folds in two. In the folding keyboard structure with the connecting shafts 3 as depicted in FIG. 1, the bearings 2A and 2B project into the plane of key operation from the enclosure 1 and hence encumber the key operation. The disclosure of Japanese Pat. Application Laid-Open No. 17723/91 makes no reference to how an ordinary keyboard assembly having key tops of adjacent arrays displaced from each other is split into two keyboard halves to form the folding structure.

The folding keyboard proposed in Japanese Pat. Application Laid-Open No. 148315/90 has a construction in which two keyboard halves are pivotally secured at opposite ends of their inner marginal edges to both ends of two common flat hinges to form a folding keyboard structure. In this instance, the folding keyboard has two rotary shafts and a suitable selection of the shaft spacing enables the keyboard halves to fold relative to each other with practically no clearance therebetween. Since the flat hinges are protrusively provided on side walls of the keyboard enclosure, however, this conventional folding structure does not look good. Further, since the rotary shafts which connect the two flat hinges to the side walls of the enclosure are each secured thereto at only one side of the hinge, the prior art folding structure is defective in that the rotary shafts readily rattle and are easily deformed by external forces in directions in which the two keyboard halves are twisted relative to each other. The disclosure of Japanese Pat.Application Laid-Open No. 148315/90 is also silent about how the ordinary keyboard having key tops arranged at a different pitch for each array is split into two to form the folding keyboard structure.

SUMMARY OF THE INVENTION

It is therefore an object of the present invention to provide a folding keyboard which is composed of keyboard halves each having key tops displaced at a different pitch for each array as usual, and having hinges and bearings that are flush with the surface of the keyboard enclosure and rattle-free.

A folding keyboard according to a first aspect of the present invention comprises:

a keyboard structure having key tops arranged in a rectangular form or pattern with more frontage than depth, the key tops of adjacent arrays being displaced from each other;

an enclosure for housing the keyboard structure, the enclosure having a bottom panel for mounting the keyboard structure and a frame raised from the periphery of the bottom panel and surrounding the keyboard structure mounted in the enclosure, the frame having front; rear, left- and right-hand banks respectively adjoining the front, rear, left- and right-hand sides of the keyboard structure;

wherein the enclosure is split along a center line in its left-to-right direction into left- and right enclosure halves having left- and right-hand frame segments, left- and right-hand front banks and left- and right-hand rear banks, and the keyboard structure is split along a key top demarcation line closest to the center line into left- and right-hand keyboard halves, a center line of the enclosure for folding it being set above the key tops along the center line of the enclosure in the left-to-right direction; and wherein first left- and right-hand coupler seats are formed in adjacent inner marginal edges of the left- and right-hand rear banks, second left- and right-hand coupler seats are formed in adjacent inner marginal edges of the left- and right-hand front banks, and first and second bearing means are formed in the left- and right-hand rear and front banks respectively adjacent the first and second left- and right-hand coupler seats;

first and second couplers having its left- and right-hand end portions received in the first and second coupler seats of the left- and right-hand frames, respectively; and first and second connecting pins passing through the left- and right-hand end portions of the first and second couplers and the first and second bearing means in parallel to the folding center line, whereby the left- and right-hand enclosure halves are pivotally secured to the left- and right-hand end portions of the first and second couplers;

wherein the centers of the first and second connecting pins are set at positions of the same distance from the folding center line.

According to a second aspect of the present invention, in the folding keyboard of the first aspect, the inner end faces of the left- and right-hand keyboard halves are covered with a flexible sheet secured to a sliding board having its one end secured to the bottom panel of one of the left- and right-hand enclosure halves and having the other end formed to be slidable on the bottom panel of the other enclosure half.

DESCRIPTION OF THE PREFERRED EMBODIMENTS

First Embodiment

Figure 1:
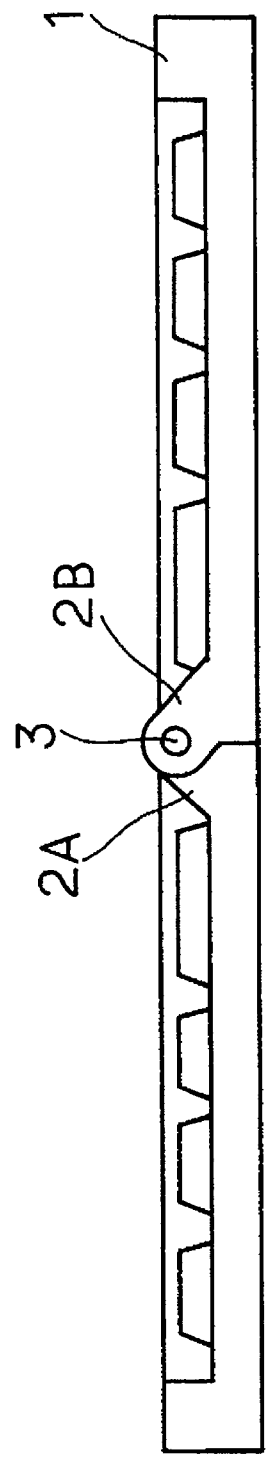
FIG. 1 is a side view for explaining the prior art.
Figure 2:
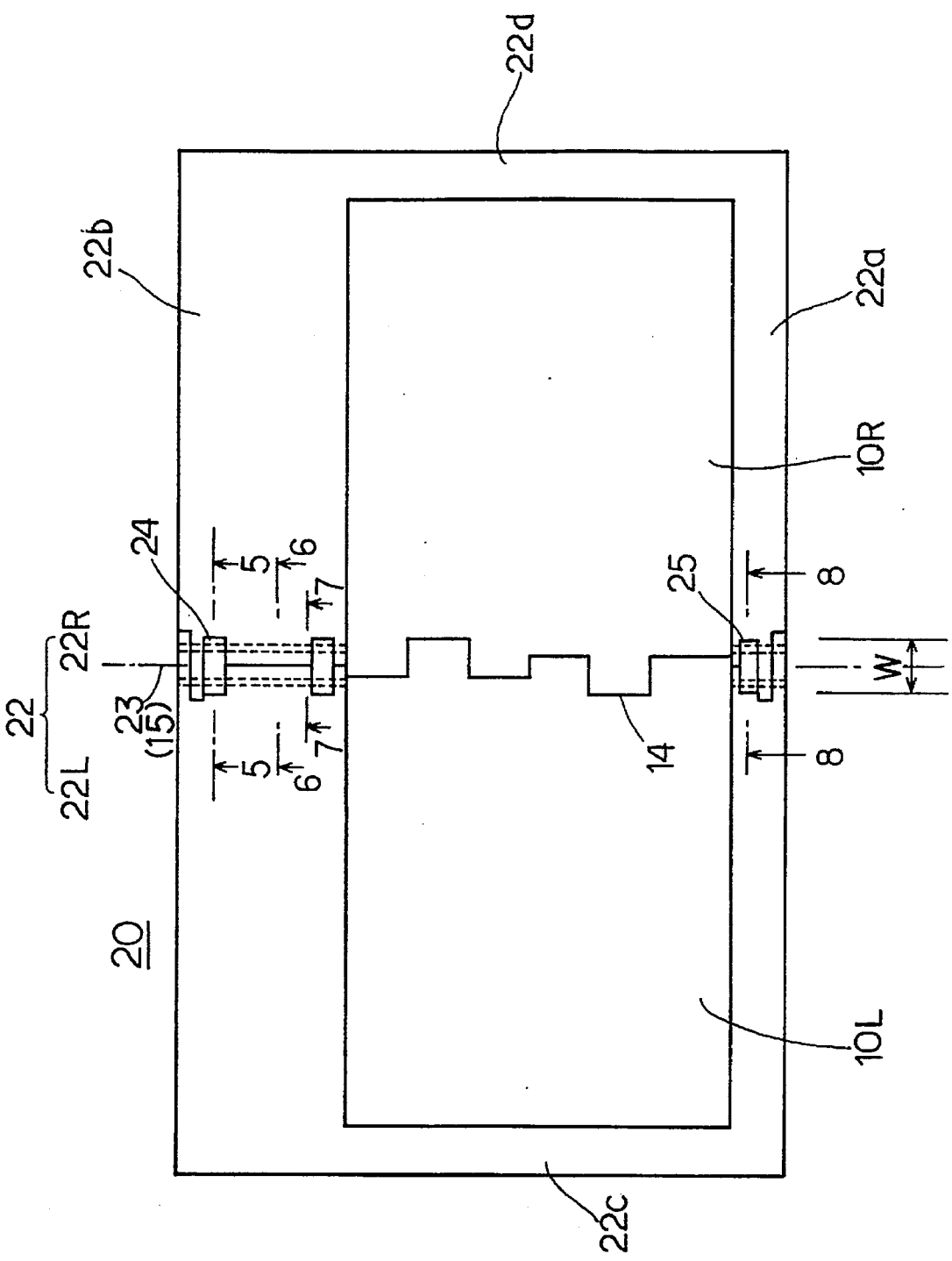
FIG. 2 is a plan view for explaining the construction of the principal part of an embodiment according to the present invention.
Figure 3:
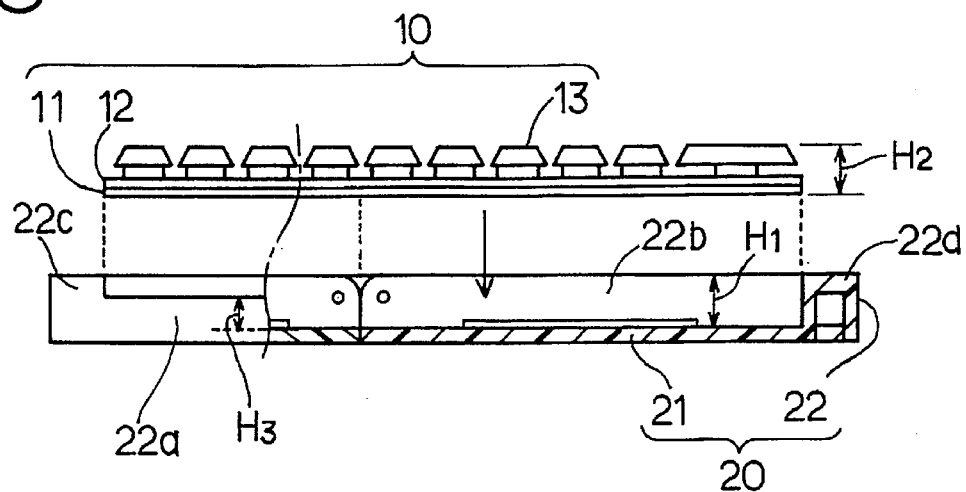
FIG. 3 is a diagram, partly in section, illustrating the keyboard structure of the FIG. 2 embodiment.

In FIG. 2 there is shown the general construction of a first embodiment of the folding keyboard according to the present invention. In FIG. 2, for the sake of brevity, key switches and key tops are not shown. Reference numeral 10 denotes a keyboard structure and 20 is an enclosure for housing the keyboard structure 10. As depicted in FIG. 3, the enclosure 20 is made up of a bottom panel 21 for supporting a backing board 11 of the keyboard structure 10 and a frame 22 which forms banks higher than the bottom of the bottom panel 21 on all sides thereof and surrounding key switches mounted in the keyboard structure 10. The frame 22 consists of front, rear, left-hand and right-hand banks 22a, 22b, 22c and 22d, and hence forms a hollow structure. The rear bank 22b is wide in the front-to-back direction and houses one end portion of a printed circuit sheet of a membrane switch sheet 12 forming key switches arranged in a one-to-one correspondence with key tops of the keyboard structure 10 and a connector (not shown) connected to the printed circuit sheet 12. As shown in FIG. 3, the heights $H_1$ of the rear, left- and right-hand banks 22b, 22c and 22d of the frame 22 are slightly larger than the height $H_2$ of the keyboard structure 10, i.e. the height $H_2$ from the bottom of the backing board 11 to the upper surface of the key top 13, and the height $H_3$ of the front bank 22a is smaller than the height $H_2$ so that it will not encumber the key operation.

Figure 4:
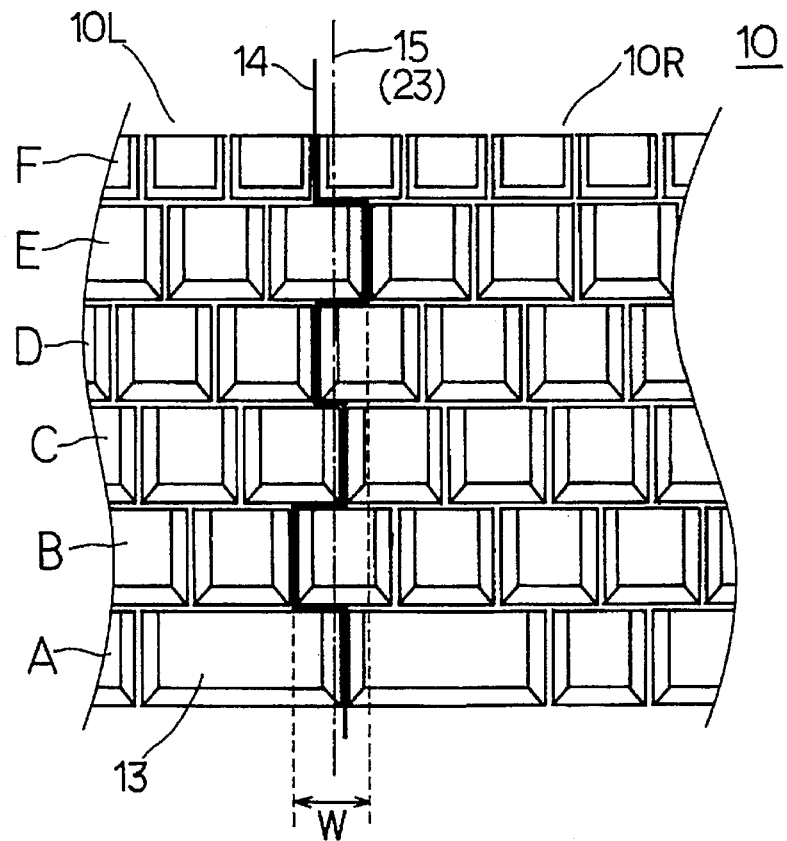
FIG. 4 is an enlarged diagram of a key top arrangement, showing a keyboard folding center line along a line of demarcation between adjacent key top arrays.

According to the present invention, as illustrated in FIG. 4, the keyboard structure 10 is split along a line of demarcation between key tops closest to the center line 15 of the keyboard structure 10 lengthwise thereof. That is, the keyboard structure 10 is divided into left- and right-hand keyboard halves 10L and 10R. In FIG. 2, reference numeral 14 denotes the demarcation line between left- and right-hand key top groups along which the keyboard structure 10 is separated into the two keyboard halves 10R and 10L. A center line 23 along which the enclosure 20 is folded (which line will hereinafter be referred to as a folding center line) is set to lie within the range W of displacement of the demarcation line 14 in the horizontal plane (FIG. 2).

With a view to increasing the operability of the keyboard, it is quite common in the art to displace the key tops 13 of adjacent arrays relative to each other. FIG. 4 shows standard or normal arrays of key tops 13 at substantially the center of the keyboard structure 10 and the demarcation line 14. In this example, letting the arrays of key tops 13 be represented by A to F as they are separated from the keyboard operator side, the key tops 13 of the arrays A and B are displaced ½ pitch and the key tops of the arrays B and C are also displaced ½ pitch. The key tops of the arrays C and D, D and E, and E and F are displaced ¼, ½ and ½ pitches, respectively. According to the present invention, the keyboard structure 10 is split along the demarcation line 14 between the key tops 13 nearest to the center line 15 of the keyboard structure 10 lengthwise thereof. As a result, the maximum range of deviation W of the demarcation line 14 is ¾ the width of the standard key top and the maximum range of deviation of the demarcation line 14 from the center line 15 is ½ the width of the key top.

Moreover, the enclosure 20 is also split into left- and right-hand enclosure halves 20L and 20R along the aforementioned folding center line 23 which is set within the deviation range W as mentioned above. By this, the bottom panel 21 of the enclosure 20 is also split into left- and right-hand bottom panels 21L and 21R and the frame 22 is also split into left- and right-hand frame segments 22L and 22R. Accordingly, the front and rear banks 22a and 22b are divided into left- and right-hand front and left- and right-hand rear banks 22aL, 22aR and 22bL, 22bR, respectively. The left- and right-hand enclosure halves 20A and 20R are pivotally secured to each other by couplers $24_1$, $24_2$ and 25 that couple end portions of the left- and right-hand frame segments (i.e. opposed end portions of the left- and right-hand rear banks 22bL, 22bR and the left- and right-hand front banks 22aL, 22aR).

Figure 7:
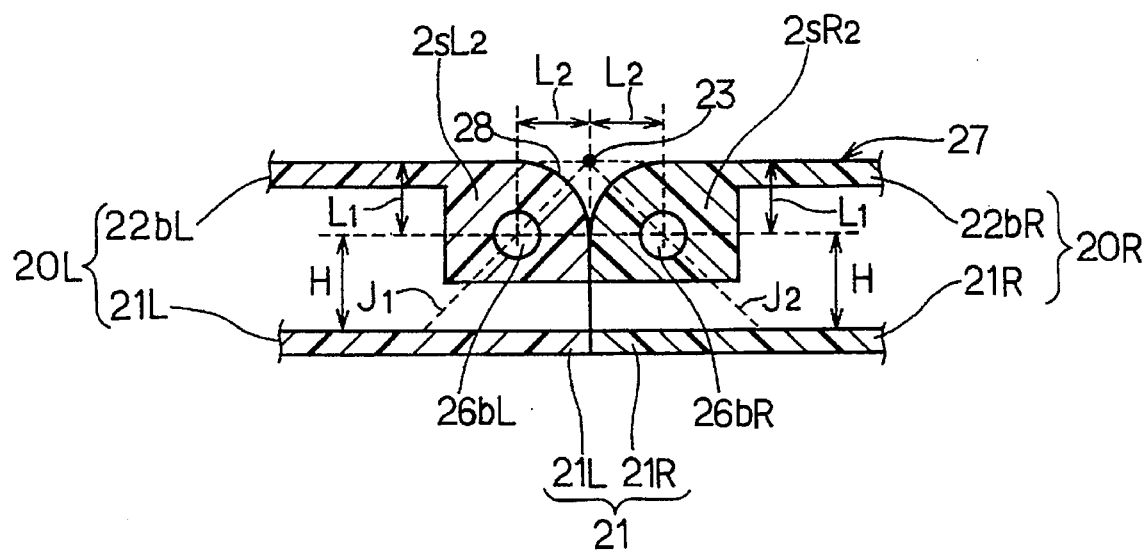
FIG. 7 is a sectional view taken on the line 7—7 in FIG. 2.
Figure 8:
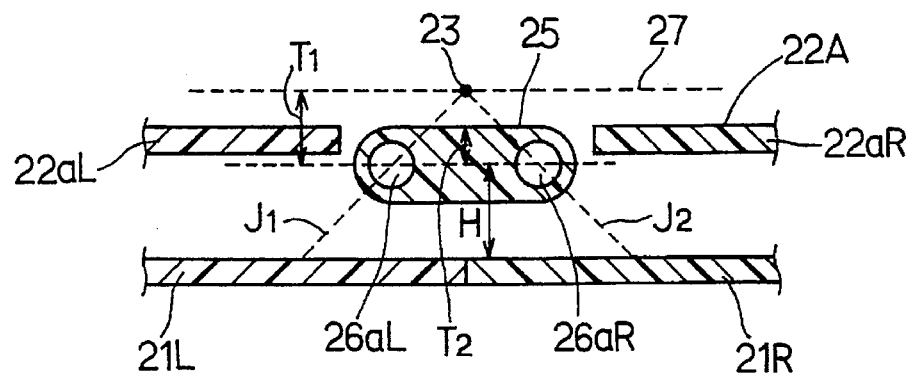
FIG. 8 is a sectional view taken on the line 8—8 in FIG. 2.
Figure 9:
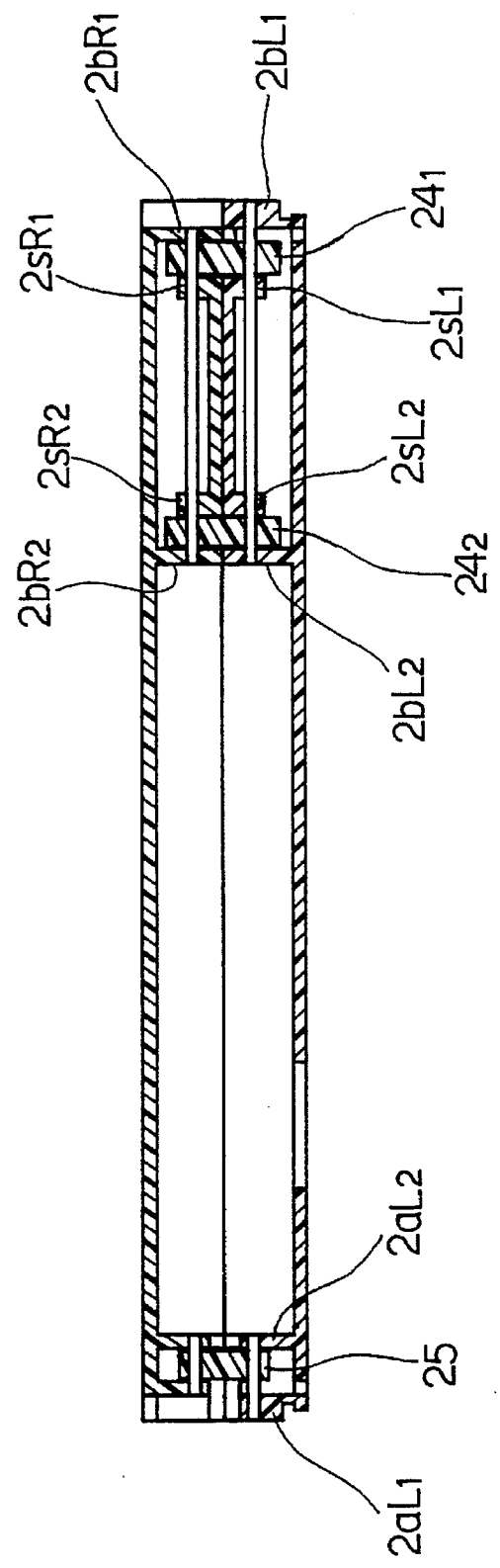
FIG. 9 is a sectional view taken on the line passing through a connecting pin, showing the enclosure in its folded state.
Figure 10:
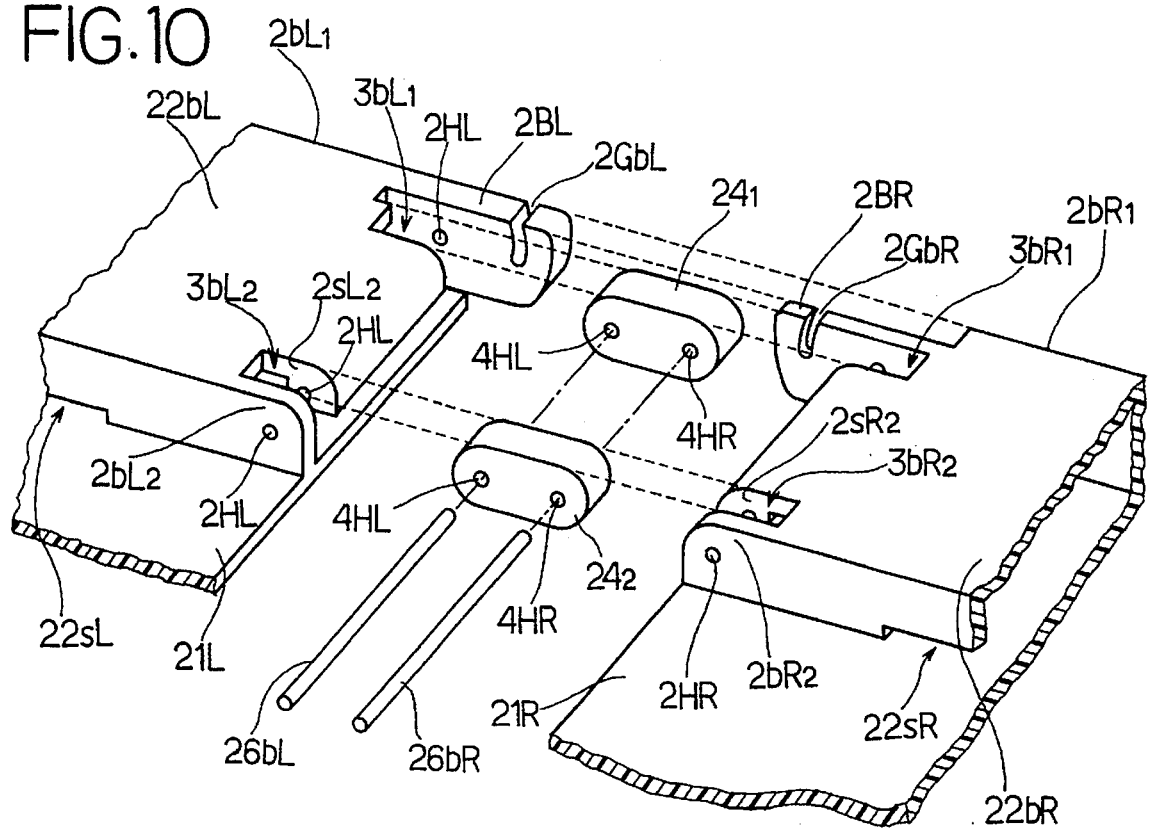
FIG. 10 is a partial exploded perspective view of a coupling structure in the rear bank.
Figure 11:
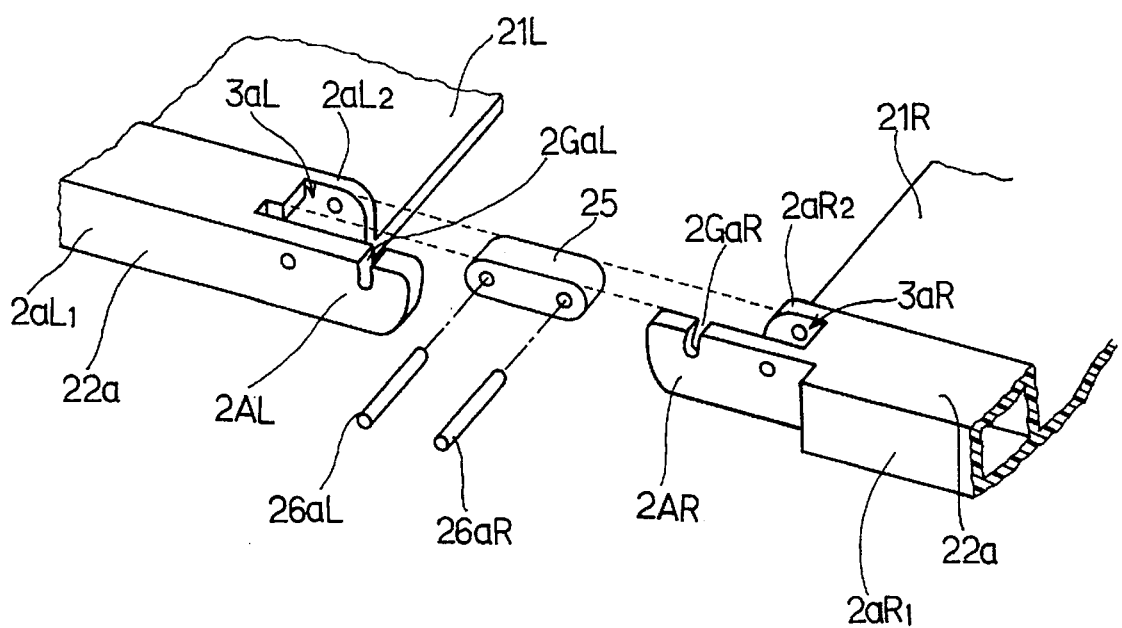
FIG. 11 is a partial exploded view of a coupling structure in the front bank.

FIGS. 5 to 8 are sectional views taken on the lines 5—5, 6—6, 7—7 and 8—8 in FIG. 2, respectively, FIG. 9 is a sectional view taken on the line passing through center lines of connecting pins 26bL, 26bR, 26aL and 26aR with the keyboard folded, and FIGS. 10 and 11 are exploded perspective views illustrating the coupling portions of the split rear banks 22b and the split front banks 22a, respectively. In this embodiment, as shown in FIGS. 5 to 8, the left- and right-hand frame segments 22L and 22R are coupled together by two couplers $24_1$ and $24_2$ in the wide rear bank 22b and by one coupler 25 in the narrow front bank 22a. In opposed end portions of the split rear banks 22b of the left- and right-hand frame segments 22L and 22R there are formed coupler seats or pockets $3bL_1$, $3bR_1$ and $3bL_2$, $3bR_2$ adjacent rear side walls $2bL_1$, $2bR_1$ and front side walls $2bL_2$, $2bR_2$ for receiving left and right halves of the couplers $24_1$ and $24_2$, respectively.

Figure 5:
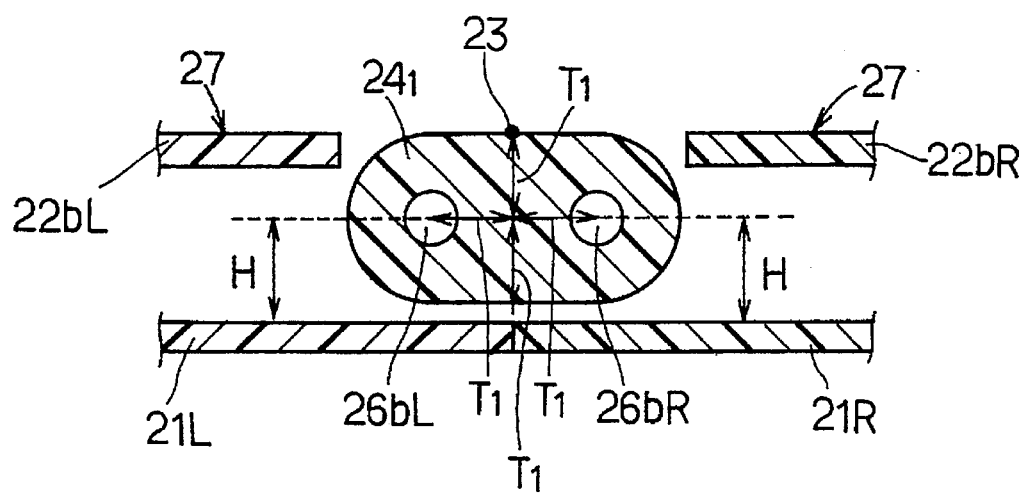
FIG. 5 is a sectional view taken on the line 5—5 in FIG. 2.
Figure 6:
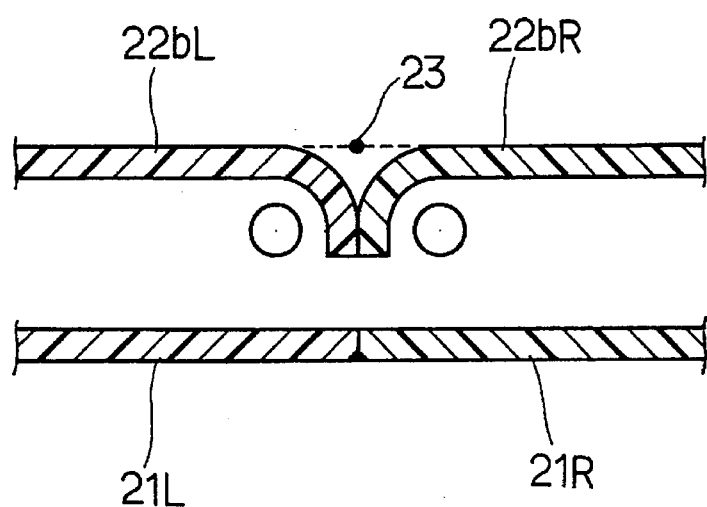
FIG. 6 is a sectional view taken on the line 6—6 in FIG. 2.

Now, a description will be given, with reference to FIGS. 5, 7 and 8, of the positions of the connecting pins pivotally supporting the couplers $24_1$, $24_2$ and 25. FIG. 5 is a sectional view of the coupler $24_1$ along the line 5—5 in FIG. 2; FIG. 7 is a sectional view showing bearing contact pieces $2sL_2$ and $2sR_2$ along the line 7—7 in FIG. 2; and FIG. 8 is a sectional view of the coupler 25 along the line 8—8 in FIG. 2. The sectional view of the coupler $24_2$ is the same as that of FIG. 5 and hence is not shown.

The left- and right-hand connecting pins 26bL and 26bR of the couplers $24_1$ and $24_2$ and the left- and right-hand connecting pins 26aL and 26aR of the coupler 25 are axially aligned on the left and right sides, respectively, and they are disposed in parallel to the folding center line 23 and the bottom panel 21. As depicted in FIGS. 5, 7 and 8, the axes of the connecting pins 26aL, 26bL and 26aR, 26bR are set on imaginary lines $J_1$ and $J_2$ extending from the folding center line 23 (assumed to be in the same plane as the top 27 of the rear band 22) toward the panel 21 at an angle of 45 degrees to the center line 23 at the positions of the same distance therefrom.

By setting the axes of the connecting pins 26aL, 26bL and 26aR, 26bR on the imaginary lines $J_1$ and $J_2$ inclined at 45 degrees at the positions of the same distance from the folding center line 23 as mentioned above, the distances $L_1$ from the axes of the connecting pins 26aL, 26bL and 26aR, 26bR to the top of the enclosure 20 (the top of the rear bank) 27 and the distances $L_2$ from the respective axes to the contact end faces of the left- and right-hand enclosure halves 20L and 20R (i.e. contact end faces of the left- and right-hand rear banks 22bL and 22bR) are equal to each other. By rounding the contact end face of each of the split rear banks 22bL and 22bR to form a ¼ cylindrical surface 28 of a radius equal to $L_1=L_2$ (FIG. 7), it is possible to turn the left- and right-hand enclosure halves 20L and 20R into their folded and unfolded states.

Moreover, by setting the thickness $T_1$ from the axes of the connecting pins 26bL and 26bR of the coupler $24_1$ to the top and back surfaces thereof to be equal to the distance $L_1$ from the axes of the connecting pins 26bL and 26bR to the top surface 27 of the enclosure 22, the top surface of the coupler $24_1$ conforms to the top surface 27 of the enclosure 20 and becomes flush therewith when the enclosure 20 is unfolded. The same goes for the coupler $24_2$.

The front bank 22a of the enclosure 20 near the operator is formed lower than the key top 13 as described previously with respect to FIG. 3. As shown in FIG. 8, the positions of the left- and right-hand connecting pins 26aL and 26aR, which pass through the coupler 25 mounted in the front bank 22a, relative to the folding center line 23 are the same positions as those of the connecting pins 26bL and 26bR in the rear bank 22b shown in FIG. 7. That is, the connecting pins 26aL and 26aR are positioned at the same distance as in FIG. 7 on the imaginary lines $J_1$ and $J_2$ inclined at 45 degrees to the folding center line 23 assumed to be flush with the top surface 27 of the rear bank 22b. Accordingly, the heights H of the connecting pins 26aL and 26aR from the split bottom panels 21L and 21R and the depth $T_1$ from the top surface 27 of the frame 22 to the axes of these pins are the same as in FIG. 7. The thickness of the coupler 25 from the plane containing the axes of the connecting pins 26aL and 26aR is set to be equal to the distance $T_2$ from the top surface 22A of the front bank 22a to the plane containing the axes of the pins 26aL and 26aR so that the top of the coupler 25 becomes flush with the top 22 of the front bank 22a when the enclosure 20 is unfolded.

Reference numerals 2BL and 2BR denote protective contact pieces which, when the enclosure 20 is unfolded, project out from the rear side walls $2bL_1$ and $2bL_2$ of the rear banks of the left- and right-hand frame segments 22L and 22R and across the folding center line 23 so that they overlap. A bearing contact piece $2sL_1$ is extended downward from the ceiling of the left-hand rear bank 22bL in opposing relation to the protective contact piece 2BL across the coupler seat $3bL_1$ (FIG. 9). Similarly, a bearing contact piece $2sL_2$ is extended downward from the ceiling of the rear bank 22b in opposing relation to the front side wall $2bL_2$ across the coupler seat $3bL_2$. The opposed end portions of the rear and front side walls $2bL_1$ and $2bL_2$ of the rear bank 22b are used as bearing portions; the bearing contact pieces $2sL_1$ and $2sL_2$ and the rear and front side walls $2bL_1$ and $2bL_2$ have through holes 2HL which are axially aligned across the coupler seats $3bL_1$ and $3bL_2$. The right-hand rear bank 22bR has the coupler seats $3bR_1$ and $3bR_2$ adjacent the side walls $2bR_1$ and $2bR_2$ and bearing contact pieces $2sR_1$ and $2sR_2$ adjacent the coupler seats $3bR_1$ and $3bR_2$ (FIG. 9), and the side walls $2bR_1$, $2bR_2$ and the bering contact pieces $2sR_1$, $2sR_2$ have axially aligned through holes 2HR.

The couplers $24_1$ and $24_2$ are rectangular blocks of about the same widths as those of the coupler seats $3bR_1$ and $3bR_2$. The opposite end portions of the couplers $24_1$ and $24_2$ are rounded to form semi-cylindrical surfaces and have equally spaced through holes 4HL and 4HR of the same size at the centers of the semi-cylindrical end portions. The left-hand end portions of the couplers $24_1$ and $24_2$ are received in the coupler seats $3bL_1$ and $3bL_2$ with the connecting pins 26bL inserted in the through holes 2HL and 4HL. Likewise, the right-hand end portions of the couplers $24_1$ and $24_2$ are received in the coupler seats $3bR_1$ and $3bR_2$ with the connecting pin 26bR inserted in the through holes 2HR and 4HR. In this way, the split banks 22bL and 22bR are pivotally secured to each other through the couplers $24_1$ and $24_2$. Thus, the opposite end portions of the couplers $24_1$ and $24_2$ are pivotally held by the side walls $2bL_1$, 2bR1, $2bL_2$, $2bR_2$ and the bearing contact pieces $2sL_1$, $2sR_1$, 2sL2, $2sR_2$ by which the coupler seats $3bL_1$, $3bR_1$, $3bL_2$ and $3bR_2$ are defined. Also in the front bank 22a, the opposite end portions of the coupler 25 are pivotally held by the side walls $2aL_1$, $2aR_1$ and $2aL_2$, $2aR_2$ forming the sides of the coupler seats 3aL and 3aR.

The protective contact pieces 2AL, 2BL and 2AR, 2BR extend in excess of the maximum range of deviation of the demarcation line 14 from the folding center line 23 when the left- and right-hand enclosure halves 20L and 20R pivotally secured to each other are unfolded. These protective contact pieces have in their top end faces notches 2GaL, 2GbL and 2GaR, 2GbR which receive the mating connecting pins 26aR, 26bR and 26aL, 26bL.

Figure 12:
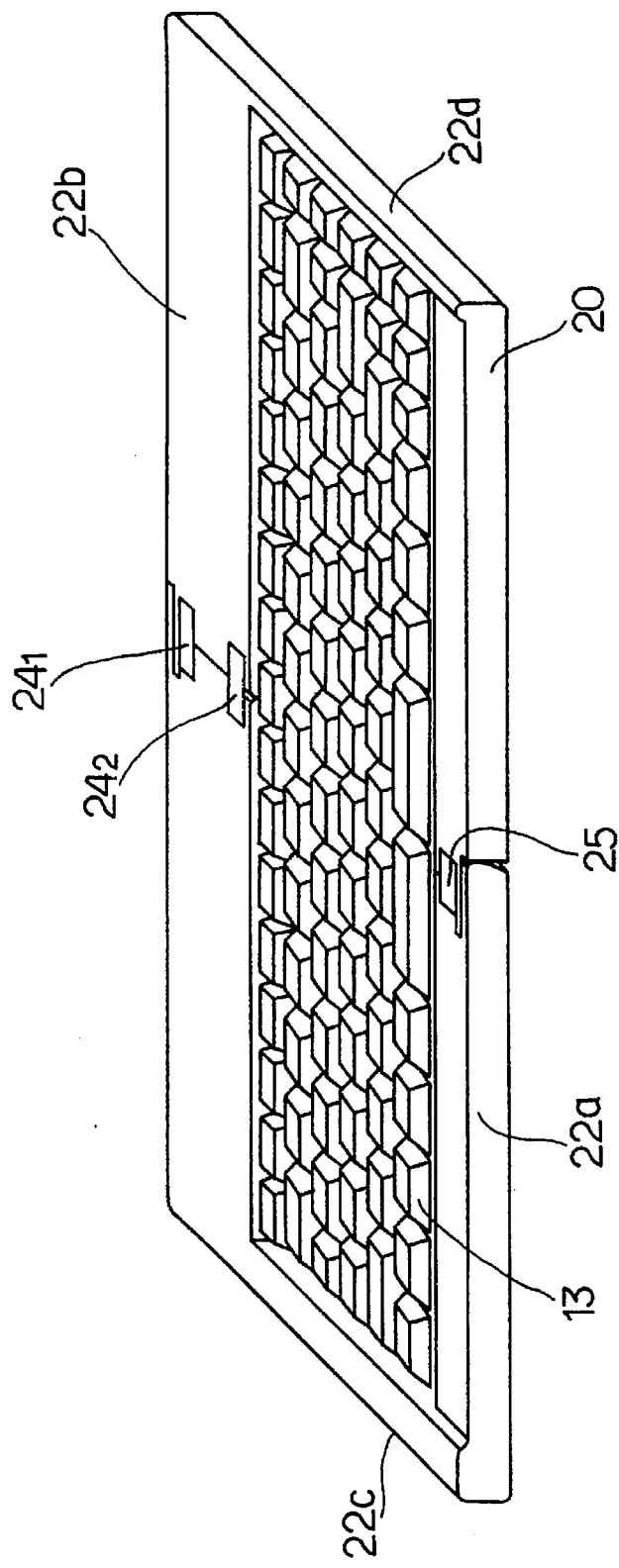
FIG. 12 is a perspective view of the entire folding keyboard structure of the first embodiment in its unfolded state.

FIG. 12 illustrates, in perspective, the entire structure of the keyboard of the first embodiment in its unfolded state. In this embodiment, since the connecting pins 26bL, 26bR, 26aR and 26aR which connect the couplers $24_1$ and $24_2$ are supported at both ends by the side walls or the bearing contact pieces, the split enclosure halves 20L and 20R pivotally secured to each other are less rattling than in the past. The front bank 22a is formed lower than the key top 13 as referred to previously, but since the left- and right-hand banks 22c and 22d are equal in height to the rear bank 22b, the left- and right-hand key top groups 13 of the left- and right-hand keyboard halves 10L and 10R remain out of contact with each other when the keyboard 10 is folded, and even when the keyboard remains folded for a long period of time, no bad influence is exerted to the key switches.

Figure 13:
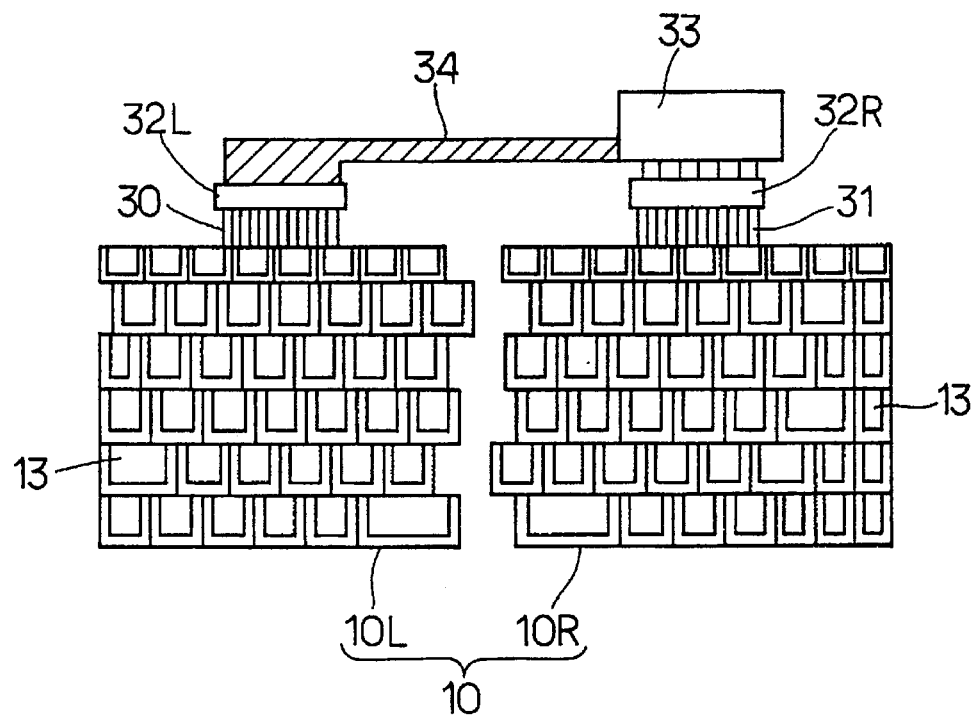
FIG. 13 is a plan view for explaining the electrical connection of the folding keyboard according to the present invention.

FIG. 13 shows an electrical connection scheme of the two-split keyboard structure 10. On each of the backing boards 11 of the split keyboard halves 10L and 10R (FIG. 3) there is bonded the membrane switch sheet 12 having formed therein membrane switches corresponding to respective key tops and printed circuit patterns connected to the membrane switches. Reference numerals 30 and 31 in FIG. 13 denote terminal portions of the membrane switch sheet 12, to which connectors 32L and 32R are connected, and hence the terminal portions 30 and 31 are connected via the connectors 32L and 32R to a circuit unit 33 in the rear bank 22. A lead wire 34 interconnecting the connector 32L and the circuit unit 33 is flexible and long enough to prevent the application thereto of undue or excessive stress when the keyboard is folded and unfolded. The lead wire 34 in the rear band 22b is exposed between the opposed ends of the split rear banks 22bL and 22bR when the enclosure 20 is folded, but in this embodiment the lead wire 34 is protected by the protective contact pieces 2AL and 2AR extended from the front side walls $2aL_1$ and $2aR_1$ of the split front banks 22aL and 22aR and by the protective contact pieces 2BL and 2BR extended from the rear side walls $2bL_1$ and $2bR_1$ of the split rear banks 22bL and 22bR.

Figure 14:
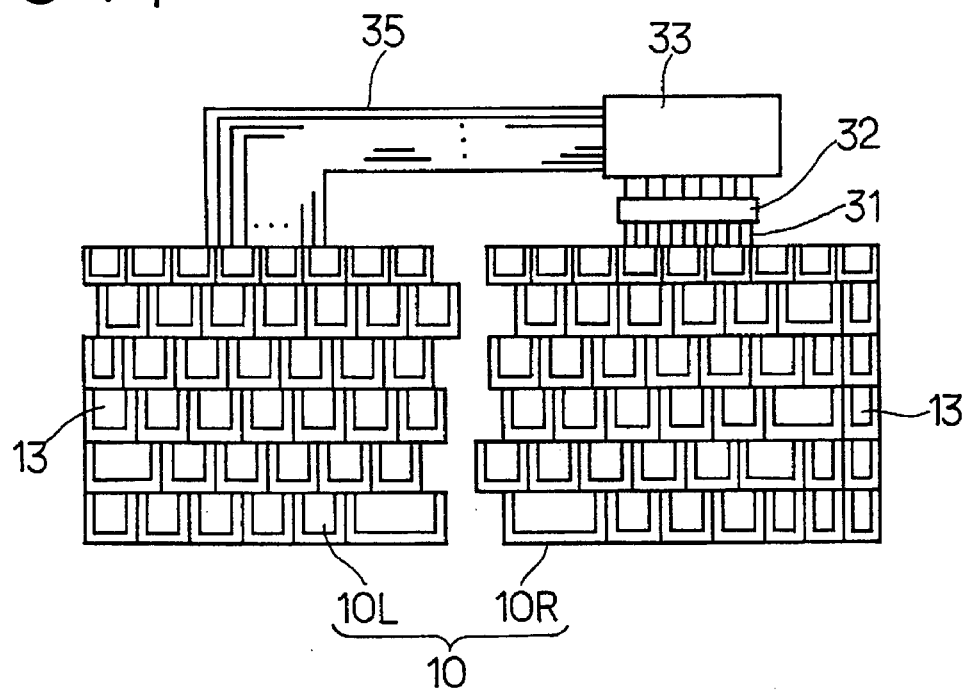
FIG. 14 is a plan view showing another example of the electrical connection.
Figure 15:
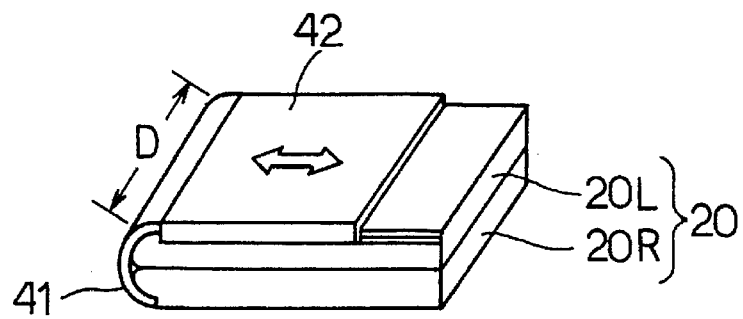
FIG. 15 is a perspective view showing the folded state of a keyboard according to a second embodiment of the present invention.

FIG. 14 illustrates another example of the electrical connection. In this example, the membrane switch sheet 12 has a lead wire portion 35 formed integrally therewith and connected to the circuit unit 33. Also in this case, the lead wire portion 35 is formed long enough to prevent the application thereto of undue or excessive stress.

While in the above the keyboard structure 10 has been described to be supported on the backing board 11, the bottom panel 21 of the enclosure 20 may also be used as a substitute for the backing board 11. In this instance, the thickness of the keyboard assembly could be reduced by the thickness of the backing board 11.

In the above-described first embodiment of the invention, the inner end faces of the left- and right-hand keyboard halves are exposed when the keyboard is folded—this structure does not look good nor does it effectively keep dust out, and hence it readily break down. Further, since the exposed inner end faces of the keyboard halves are uneven along the demarcation line between the left- and right-hand key top groups, the keyboard is not easy to handle. Next, a description will be given of an embodiment intended to obviate such shortcomings.

Second Embodiment

This embodiment differs from the first embodiment in that the split end faces of the enclosure and the keyboard structure are covered with a flexible sheet mounted on the underside of the bottom panel of the enclosure.

FIGS. 15 to 18 illustrate a second embodiment of the folding keyboard according to the present invention, in which the parts corresponding to those in the first embodiment are identified by the same reference numerals. Also in this embodiment, the left- and right-hand enclosure halves 20L and 20R are pivotally secured to each other by the couplers $24_1$, $24_2$ and 25 (FIG. 18) as in the first embodiment.

In this embodiment, the split end faces of the enclosure halves 20L and 20R are covered with a flexible sheet 41 of a relatively elastic material which does not tear easily, such as polyurethane, rubber or elastomer. The flexible sheet 41 is fixed at one end to the underside of the bottom panel 21R of the right-hand enclosure half 20R, for instance, and at the other end to a sliding board 42 slidably mounted on the bottom panel 21L of the left-hand enclosure half 20L.

Figure 16:
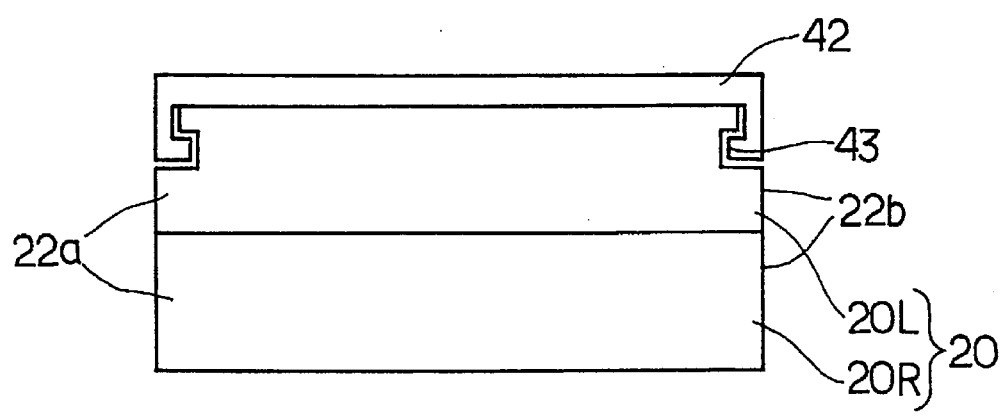
FIG. 16 is a right side view of the keyboard shown in FIG. 15.
Figure 17:
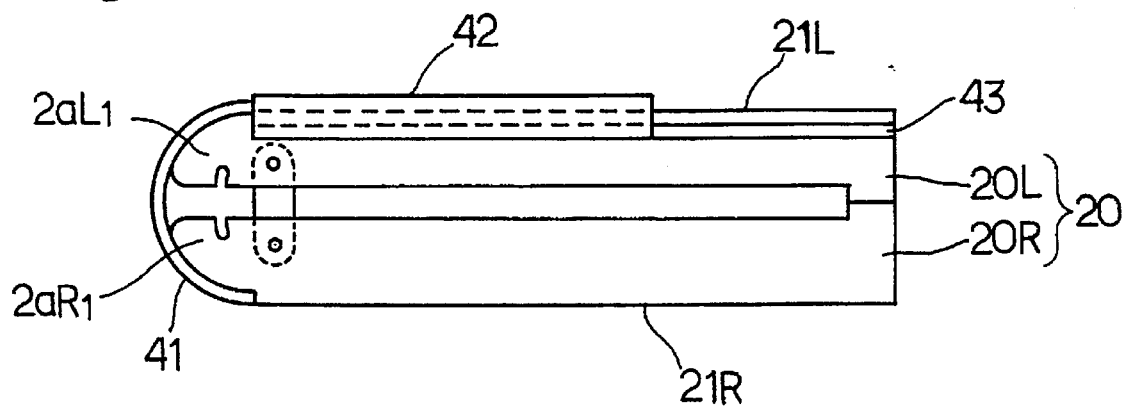
FIG. 17 is a front view of the keyboard shown in FIG. 15.

For example, as shown in FIG. 16, the sliding board 42 is formed by a thin board whose opposite marginal edges are U-shaped in cross-section, and the U-shaped marginal edge portions engage guide grooves 43 cut in the side walls of the enclosure 20L at the front and rear bank sides in parallel to the bottom panel 21 so that the sliding board 42 is held in such a manner as to be slidable on the bottom panel 21 of the left-hand enclosure half 20L from the position on the enclosure 10L closest to the couplers to the vicinity of the left-hand bank 22c lengthwise of the keyboard 10L. Protective contact pieces 2AL, 2AR and 2BL, 2BR similar to those in FIGS. 10 and 11 are extended from the side walls $2aL_1$, $2aR_1$ and $2bL_1$, $2bR_1$ of the front and rear banks. The outer marginal edges of the protective contact pieces 2AL, 2AR and 2BL, 2BR are curved so that they become substantially semi-circular as shown in FIG. 17 (in which the contact pieces 2BL and 2BR are not seen) when the enclosure 20 is folded.

Figure 18:
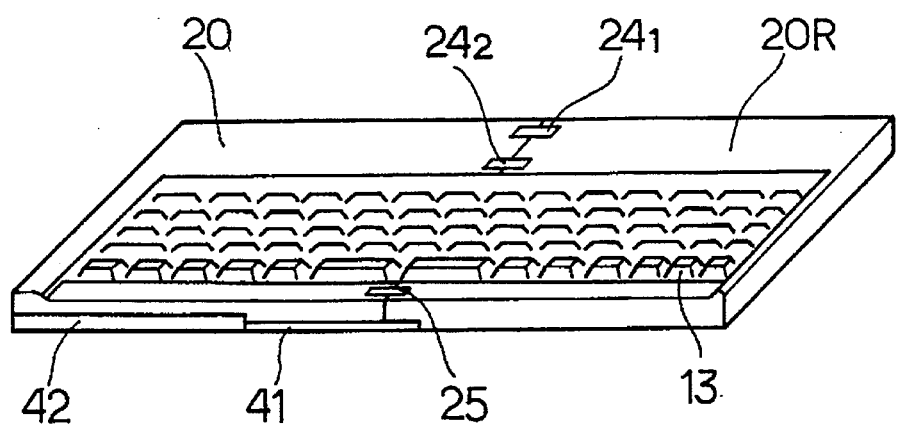
FIG. 18 is a perspective view of the keyboard of the second embodiment in its unfolded state.

When the enclosure 20 is folded, the flexible sheet 41 is so extended as to cover the outer marginal edges of the protective contact pieces 2AL, 2AR and 2BL, 2BR and is fixed to the sliding board 42 at the position nearest to the folding center line 23. Hence, when the split enclosure halves 20L and 20R are folded, the sliding board 42 is drawn to the vicinity of the line along which the enclosure halves 20L and 20R are folded, as depicted in FIG. 17. When the enclosure 20 is unfolded, the sliding board 42 is pushed aside to the vicinity of the left-hand marginal edge of the enclosure half 20L, as shown in FIG. 18.

Also in this embodiment, terminals from the membrane switch sheet 12, though not shown, are connected to the circuit unit 33 directly or via the connectors 32L and 32R in the same manner as in FIG. 13 or 14.

By selecting the width D of the flexible sheet 41 (FIG. 15) to be nearly equal to the width of the enclosure 20, the split end faces of the two enclosure halves 20L and 20R, exposed between the protective contact pieces 2AL, 2AR and 2BL, 2BR, can be covered substantially completely with the flexible sheet 41, making it possible to prevent dust from entering into the keyboard.

In the first and second embodiments the two couplers $24_1$ and $24_2$ have been described as being mounted in the rear bank 22b, but either one of them can be omitted. Additionally, the rear bank 22b has been described as being wide and housing therein the connectors 32L and 32R and the circuit unit 33, but it is also possible to make the front bank 22a wide and to house therein such elements.

It will be apparent that many modifications and variations may be effected without departing from the scope of the novel concepts of the present invention.

What is claimed is:

1. A folding keyboard comprising:

a keyboard structure having plural arrays of key tops arranged in a rectangular form or pattern with more frontage then depth, said key tops of adjacent arrays being displaced from each other;

an enclosure for housing said keyboard structure, said enclosure having a bottom panel for mounting said keyboard structure and a frame raised from the periphery of said bottom panel and surrounding said keyboard structure mounted in said enclosure, said frame having front, rear, left- and right-hand banks, respectively adjoining front, rear, left- and right-hand sides of said keyboard structure;

wherein said enclosure is split along a center line perpendicular to its left-to-right direction into left and right enclosure halves having left- and right-hand frame segments, left- and right-hand front banks and left- and right-hand rear banks, and said keyboard structure is split along a key top demarcation line closest to said center line into left- and right-hand keyboard halves, a center line of said enclosure for folding it being set above said key tops along the center line of said enclosure perpendicular to the left-to-right direction; and wherein first left- and right-hand coupler seats are formed in adjacent split marginal edges of said left- and right-hand rear banks, second left- and right-hand coupler seats are formed in adjacent split marginal edges of said left- and right-hand front banks, and first and second bearing means are formed in said left- and right-hand rear and front banks respectively adjacent said first and second left- and right-hand coupler seats;

first and second couplers having left- and right-hand end portions received in said first and second coupler seats of said left- and right-hand frames, respectively; and first and second connecting pins passing through said left- and right-hand end portions of said first and second couplers and the first and second bearing means in parallel to said folding center line, whereby said leftand right-hand enclosure halves are pivotally secured to said left- and right-hand end portions of said first and second couplers;

wherein the centers of said first and second connecting pins are set at positions of the same distance from said folding center line.

2. The folding keyboard of claim 1, wherein the centers of said first and second connecting pins are set at positions of the same distance from said folding center line on straight lines extending therefrom in directions away from each other at an angle of 45 degrees to said bottom panel.

3. The folding keyboard of claim 1, wherein the height of said front bank is lower than the height of said key tops.

4. The folding keyboard of claim 1, wherein mutually adjoining split end faces of said left- and right-hand rear banks above said first left- and right-hand connecting pins are rounded to form ¼ cylindrical surfaces.

5. The folding keyboard of claim 1, wherein third left- and right-hand coupler seats are formed in mutually adjoining split end faces of said left- and right-hand rear banks and third bearing means are formed in said left- and right-hand rear banks adjacent said third coupler seats; and wherein a third coupler is provided which has it left- and right-hand end portions received in said third coupler seats of said left- and right frames and said first left- and right-hand connecting pins are inserted through said left- and right end portions of said third coupler and said third bearing means in parallel to said folding center line.

6. The folding keyboard of claim 1, wherein when said enclosure is unfolded, the tops of said first and second couplers are flush with the tops of said rear and front banks, respectively.

7. The folding keyboard of claim 1, wherein said keyboard structure has a membrane switch sheet having membrane switches arranged in a one-to-one correspondence with said key tops and said rear bank is hollow and houses therein a circuit unit electrically connected to said membrane switches.

8. The folding keyboard of claim 7, wherein left- and right-hand slits, through which left- and right-hand terminals connected to said membrane switch sheets of said left- and right-hand keyboard halves are introduced into said left- and right-hand rear banks are formed on the inner side walls of said left- and right-hand rear banks, said left- and right-hand terminals being connected to said circuit unit in said rear bank.

9. The folding keyboard of claim 1 or 5, wherein said left- and right-hand rear banks have first left- and right-hand protective contact pieces which, when said enclosure is unfolded, are extended from rear side walls of said rear banks in parallel thereto across said folding center line and overlap each other, and said left- and right-hand front banks have second left- and right-hand protective contact pieces which are extended from their front side walls in parallel thereto across said folding center line and overlap each other.

10. The folding keyboard of claim 9, wherein said first and second left- and right-hand protective contact pieces respectively have notches in their upper edges for receiving said first and second left- and right-hand connecting pins when said enclosure is unfolded.

11. The folding keyboard of claim 9, further comprising: a sliding board which is held so that it is slidable along the outer surface of the bottom panel of one of said left- and right-hand enclosure halves at right angles to said folding center line; and a flexible sheet which is spread over the bottom panel of the other one of said left- and right-hand enclosure halves and fixed at one end to said bottom panel of said one enclosure half and at the other end to said sliding board so that when said enclosure is unfolded, said flexible sheet covers the outer peripheral edges of said first and second protective contact pieces and the split end faces of said keyboard halves.

* * * * *